(12) United States Patent  
Swan

(10) Patent No.: US 7,155,166 B2  
(45) Date of Patent: Dec. 26, 2006

(54) WIRELESS PICK-AND-PACK SYSTEM

(75) Inventor: Richard J. Swan, Portola Valley, CA (US)

(73) Assignee: SAP Aktiengesellschaft, Walldorf (DE)

( * ) Notice: Subject to any disclaimer, the term of this patent is extended or adjusted under 35 U.S.C. 154(b) by 702 days.

(21) Appl. No.: 10/259,790

(22) Filed: Sep. 30, 2002

(65) Prior Publication Data

US 2004/0203409 A1    Oct. 14, 2004

Related U.S. Application Data

(60) Provisional application No. 60/383,772, filed on May 30, 2002.

(51) Int. Cl.  
*H04B 7/00* (2006.01)

(52) U.S. Cl. .................. 455/66.1; 455/41.2; 455/414.2; 455/456.3; 455/556.1; 455/556.2; 235/353; 340/572.1; 709/28

(58) Field of Classification Search ............... 455/66.1, 455/556.1–556.2, 41.1–41.2, 404.2, 414.1–414.2, 455/422.1, 440, 456.1, 456.3, 550.1, 572.1, 455/557, 566, 90.3, 575.1, 552.1; 235/383, 235/375, 472; 340/572.1–572.2, 572.4, 572.8, 340/825.94, 825.36; 705/28, 20–23, 16  
See application file for complete search history.

(56) References Cited

U.S. PATENT DOCUMENTS 3,908,800 A    9/1975    Drapeau 5,880,449 A    3/1999    Teicher et al.  
6,084,512 A    7/2000    Elberty et al.  
6,105,004 A  *  8/2000    Halperin et al. ............... 705/28  
6,205,396 B1   3/2001    Teicher et al.  
6,464,142 B1   10/2002   Denenberg et al.  
6,496,121 B1  * 12/2002   Otto ........................ 340/691.6

FOREIGN PATENT DOCUMENTS

FR    2 631 721        5/1988  
WO    00/77704         12/2000

OTHER PUBLICATIONS

Futurlec, *New Two-Chip Contactless Angular Measurement Solution from Philips*, 2 pages, http://www.futurlec.com/News/Philips/AngularSensor.html, Jan. 9, 2003.  
Honeywell, *Magnetic Position Sensors*, 3 pages, http://content.honeywell.com/sensing/prodinfo/solidstate/, Jan. 9, 2003.  
Richard W. DeVaul, *MIThril*, 4 pages, http://acg.media.mit.edu/people/rich/, Jan. 9, 2003.

(Continued)

*Primary Examiner*—Pablo N. Tran  
(74) *Attorney, Agent, or Firm*—Fish & Richardson P.C.

(57) ABSTRACT

Requesting the location of items in a storage area may include accessing an entry in a list of items to be selected from item storage subareas. The entry may be associated with an item identifier code corresponding to an item storage subarea. A short-range activation signal corresponding to the item identifier code may be transmitted. The short-range activation signal may cause an indicator device associated with the item identifier code and in physical proximity to the short-range activation signal to transmit an indicator signal that indicates the location of the corresponding item storage subarea.

53 Claims, 6 Drawing Sheets

OTHER PUBLICATIONS

Siemens Dematic, *Pick-to-Light*, http://www.colby.com.au/products/pp_to_light/pptl_pick_to_light.htm, 1 page, Aug. 6, 2002.

Siemens Dematic, *Put-to-Light*, http://www.colby.com.au/products/pp_to_light/pptl_put_to_light.htm, 1 page, Aug. 6, 2002.

Siemens Dematic, *Rapid Pick*, http://www.colby.com.au/products/pp_to_light/pptl_rapid_pick.htm, 2 pages, Aug. 6, 2002.

Submitted by http;//www.kewill.com, *A Basic Guide to Material Handling And Warehouse Management*, 3 pages, http://www.isit.com/Feature.cfm?articleid=2761&tech=SC, Jan. 9, 2003.

SYPRIS Test & Measurement, *F.W. Bell Product Categories*, 1 page, http://www.sypris.com/stm/content.asp?page_id=245, 1 page, Jan. 9, 2003.

* cited by examiner

WIRELESS PICK-AND-PACK SYSTEM

CROSS REFERENCE TO RELATED APPLICATIONS

This application claims priority from U.S. Provisional Application No. 60/383,772, filed May 30, 2002, and titled WIRELESS PICK-TO-LIGHT PICK-AND-PACK SYSTEM FOR WAREHOUSES, which is incorporated by reference.

TECHNICAL FIELD

Various implementations in this description relate generally to communications for identifying product locations and, more particularly, to infrared pick and pack systems.

BACKGROUND

Manual picking and packing of goods in a warehouse or storage area environment typically involves a human picker traversing a warehouse or similar storage area and selecting, by hand, the goods corresponding to entries in a list. This list is commonly known as a picklist, and as each good in the picklist is selected, the picker typically packs it away for shipment or processing. To increase the accuracy and efficiency of this manual picking and packing of goods, pick-to-light systems have been developed. Typical pick-to-light systems provide pickers with a visual cue as to the location of the storage container or storage subarea that contains the goods corresponding to the entries in the picklist. For example, some pick-to-light systems include lights attached to or positioned near each storage subarea (for example, a shelf or designated floor space) or storage container (for example, a bin or a crate) in the storage area. The lights provide a visual cue to the picker by illuminating or flashing if the corresponding storage subarea or storage container contains the goods in the picklist. Other pick-to-light systems include a light emitting diode (LED) display associated with a set of storage containers or storage subareas. The LED display is typically an alphanumeric display that provides a picker with the coordinates of the containers or subareas that contain the goods in the picklist.

Typical pick-to-light systems are limited in both flexibility and efficiency. First, typical pick-to-light systems tend to use fixed wiring to connect the lights or LED displays to their corresponding storage subareas or containers. The fixed wiring makes it difficult to rapidly change the location of goods in the storage area. For example, moving a set of crates from one location to another may require rewiring the lights associated with those crates or, alternatively, may require using entirely different lights and reprogramming the pick-to-light system accordingly. Second, typical pick-to-light systems tend to be ill-suited to support the simultaneous processing of multiple picklists in the same region of the warehouse. Typical systems may allow such simultaneous processing by introducing yet another cognitive step into the picking process. For example, different colored lights may be used for different picklists, but doing so forces a picker to identify not just which bin has an illuminated light near it but also requires that the picker further determine the color of the light and whether that color corresponds to his or her picklist. Introduction of this extra color determination cognitive step is undesirable in that it may lead to more errors and further decreases the accuracy of the manual picking process. The extremely high accuracy demands of manual picking and packing (for example, 99% accuracy) makes introduction of such an added margin of error undesirable.

SUMMARY

One implementation of a pick-and-pack system that provides both flexibility and efficiency includes battery-powered indicator devices that are each coupled to a given storage subarea or storage container within a storage area. The picker traverses the storage area while carrying a mobile computing device that is communicatively coupled to a mobile transmitter. The mobile computing device accesses item entries in a picklist and communicates each item entry to the mobile transmitter one at a time for processing.

Continuing with this implementation, the mobile transmitter sends out a short-range infrared (IR) activation signal that corresponds to the item entry currently being processed. When the picker moves the mobile transmitter into physical proximity to an indicator device, the indicator device senses the IR activation signal and determines whether to respond to the activation signal. Each indicator device will respond only if the IR activation signal includes a specific item identifier code. The item identifier codes are different for each indicator device and are associated with the items stored within the storage subarea or storage container corresponding to that indicator device. The indicator device, therefore, only responds to the IR activation signal if the activation signal is brought physically near the indicator device (for example, to within a predetermined distance such as ten feet) and if the activation signal includes the item identifier code corresponding to that indicator device. The indicator device responds to the IR activation signal by illuminating a light that allows the picker to locate the storage container or storage subarea to which the indicator device is coupled and that will contain the items corresponding to the item entry being processed.

In one general aspect, an apparatus for requesting the location of items in a storage area includes a mobile computing device and a transmitter. The mobile computing device accesses an entry in a list of items to be selected from item storage subareas within an item storage area. The entry is associated with an item identifier code corresponding to an item storage subarea. The transmitter is communicatively coupled to the mobile computing device and is able to transmit a short-range activation signal corresponding to the item identifier code. The short-range activation signal causes an indicator device associated with the item identifier code and in physical proximity to the short-range activation signal to transmit an indicator signal in response to the short-range activation signal that indicates the location of the corresponding item storage subarea.

The mobile computing device may be a personal digital assistant (PDA), similar to devices made by Palm Corporation or iPAQ devices made by HP Corporation, laptop computer or a belt-mounted computer. The mobile computing device may receive the entry in the list of items from an enterprise system. The enterprise system may be an inventory management system. The mobile computing device may receive the entry from the enterprise system by using a docking station or over a wireless network. The wireless network may be a wireless local area network, a wide area radio network, or a cellular modem network. The mobile computing device may include a stationary component and a mobile component.

The activation signal may be an infrared signal, a short-range radio signal, or a visible light signal. The activation signal may include an embedded identifier code associated with the entry.

The transmitter may be a mobile device or a portable device that is attached to the clothing of a person. The portable device may be a badge. The transmitter may be stationary and located at fixed points in the item storage area. The mobile computing device and the transmitter may be integrated in a single unit. The single unit may be a palmtop computing device or personal digital assistant with a built-in infrared communications feature.

The transmitter may continuously send out the activation signal. The transmitter may send out the signal periodically. The period between transmissions may be fixed or random.

In another general aspect, requesting the location of items in a storage area includes accessing an entry in a list of items to be selected from item storage subareas within an item storage area. The entry is associated with an item identifier code corresponding to an item storage subarea. A short-range activation signal corresponding to the item identifier code is transmitted. The short-range activation signal causes an indicator device associated with the item identifier code to transmit an indicator signal in response to the short-range activation signal that indicates the location of the corresponding item storage subarea.

In another general aspect, an apparatus to indicate the location of items in a storage area includes a receiver, a processor, and a transmitter. The receiver receives a short-range activation signal sent by an interrogator device that is brought into close proximity to the receiver. The processor determines whether the short-range activation signal is associated with one or more items stored in an item storage subarea associated with the apparatus. The transmitter sends out an indicator signal in response to the activation signal upon determining that the activation signal is associated with one or more items stored in the item storage subarea.

The apparatus may include a base and/or a fastener for attaching to the item storage subarea within the storage area. The apparatus may further include a numerical readout that displays the number of items selected from the item storage subarea or the total number of items in the item storage subarea.

The apparatus may include a manual interface. The manual interface may allow the operator to inform the processor that item selection is complete or to manually input the number of items selected from the item storage subarea. The apparatus may include a battery and circuitry to detect the battery level. The apparatus may also include proximity detection circuitry that senses the number of times an operator selects items from the item storage subarea.

The transmitter may send out the indicator signal in response to the activation signal if the interrogator device is within a certain approximate or predetermined distance (for example, within ten feet) of the apparatus. The transmitter may send out the indicator signal in response to detecting in the activation signal an embedded identifier code associated with the item storage subarea. The indicator signal may be visible light from a flashing or illuminated light emitting diode.

In another general aspect, indicating the location of items in a storage area includes receiving a short-range activation signal sent by an interrogator device that is brought into close proximity to an indicator device. The indicator device is associated with an item storage subarea within an item storage area. It is determined whether the short-range activation signal is associated with one or more items stored in the item storage subarea. An indicator signal is transmitted in response to the activation signal upon determining that the activation signal is associated with one or more items stored in the item storage subarea. The indicator signal indicates the location of the item storage subarea.

Transmitting the indicator signal in response to the activation signal may include transmitting the indicator signal only if the interrogator device is within a certain approximate distance of the indicator device (for example, within ten feet). The number of items selected from the storage subarea may be displayed using a numerical readout associated with the indicator device. The number of times an operator selects items from the storage subarea may be sensed using proximity detection circuitry. The indicator device may be attached to the item storage subarea.

In another general aspect, a system for selecting items includes a mobile computing device, an interrogator device, and an indicator device. The mobile computing device is operable to receive an entry in a list of items to be selected from item storage subareas in an item storage area and to store the entry in a data storage. The interrogator device is operable to communicate with the mobile computing device and to send out an activation signal related to an item corresponding to the entry on the list. The indicator device includes a fastener for attaching to an item storage subarea, a receiver for receiving the activation signal, and a transmitter for indicating the location of the item storage subarea by sending out an indicator signal in response to the activation signal if the item storage subarea is associated with the entry.

The activation signal may be an infrared signal and may include an embedded identifier code associated with the entry. The mobile computing device may receive the entry in the list of items from an enterprise system. The enterprise system may comprise an inventory management system. The mobile computing device may receive the entry from the enterprise system over a wireless network. The interrogator device may comprise a portable device that may be attached to the person, and the portabled device may be a badge.

In another general aspect, selecting items includes accessing an entry in a list of items using a mobile computing device and moving an interrogator device, that communicates with the mobile computing device, into physical proximity to an indicator device. It is determined whether the indicator device is associated with an item corresponding to the entry upon the interrogator device being moved a predetermined distance from the indicator device. An indicator device is activated if the indicator device is associated with the item. The location of the item corresponding to the entry is determined based on the activated indicator device.

Determining whether the indicator device is associated with the item includes determining whether the indicator device is associated with the item based on an activation signal. The activation signal may be an infrared signal. The activation signal may include an embedded identifier code associated with the entry. Accessing the entry may include receiving the entry in the list of items from an enterprise system. The enterprise system may comprise an inventory management system. Receiving the entry from the enterprise system may include receiving the entry over a wireless network. The interrogator device may be a portable device that may be attached to the clothing of a person. The portable device may be a badge.

Other features will be apparent from the description, the drawings, and the claims.

DETAILED DESCRIPTION

Figure 1:
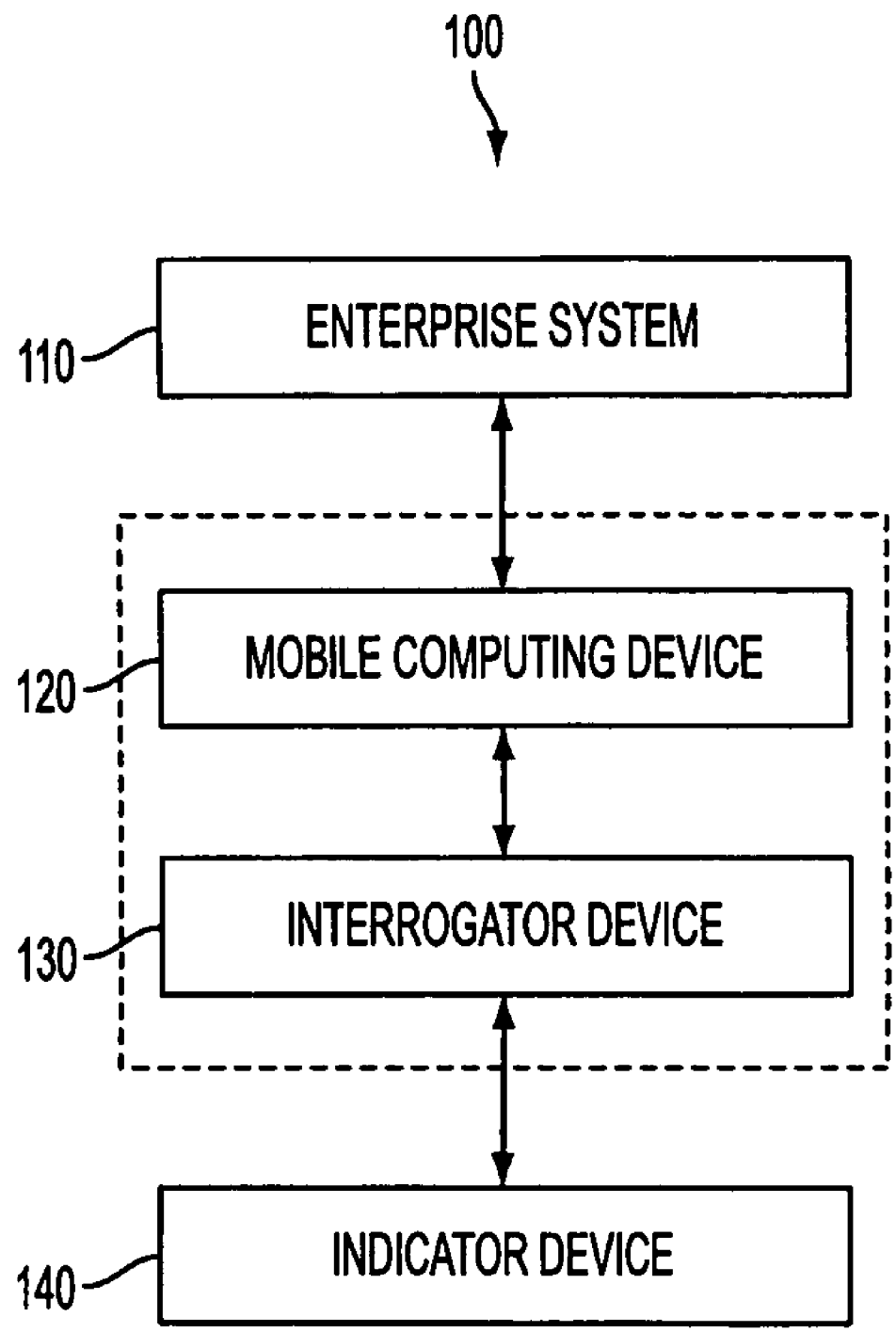
FIG. 1 is an exemplary block diagram of an item selection system.

Referring to FIG. 1, an item selection system 100 includes an enterprise system 110, a mobile computing device 120, an interrogator device 130, and an indicator device 140. The enterprise system 110 is an inventory management system that stores and processes information related to items in inventory. The enterprise system 110 may be, for example, a standalone system or part of a larger business support system. The enterprise system 110 provides the mobile computing device 120 with information regarding items that need to be selected from the storage area. This information may include one or more entries in a list of items that need to be selected. The entries may include a type of item to select (for example, ¼" phillips head screw), a quantity of the item (for example, 25), a location of the item (that is, stocking location), and an item identifier code. Other information such as specific item handling instructions may also be included.

The mobile computing device 120 is a portable device that may be small enough to be carried by a user without occupying either of the hands of the user. The mobile computing device 120 receives item entries from the enterprise system 110. All of the item entries may be downloaded at one time and stored as a "picklist" (that is, a list of items to select or pick) in the memory of the mobile computing device 120. The picklist may list the item entries in a predetermined order associated with the location of the items in the storage area. For example, the order of the item entries may correspond to an item selection order that optimizes the efficiency of the path taken by the user as he or she picks items in the storage area.

Alternatively, the picklist may be stored in the enterprise system 110, and item entries may be downloaded to the mobile computing device 120 one at a time from the enterprise system 110. In this case, the next item entry is not accessed until the current item entry has been processed (that is, the items corresponding to the entry have been picked). The item entries may also be provided to the mobile computing device 120 a single entry at a time in a predetermined order associated with the location of the items in the storage area.

The mobile computing device 120 coordinates the selection of the items specified by the item entries. Specifically, the mobile computing device 120 sends an item identifier code to the interrogator device 130 and waits, in one implementation, for confirmation that item(s) associated with the item identifier code have been selected. Once such a confirmation is received, the mobile computing device 120 proceeds to the next item entry.

The interrogator device 130 receives the item identifier code from the mobile computing device 120 and transmits a short-range activation signal in response. The interrogator device 130 transmits, in one implementation, a different activation signal for each item identifier code. The activation signal is used to activate an indicator device 140 associated with an item or items corresponding to the item identifier code. The interrogator device 130 may be integrated with the mobile computing device 120, as indicated by the dashed box in FIG. 1.

The storage area may be divided into subareas and/or storage containers that are associated with different item types. The storage location information of an item entry is mapped to a storage subarea and/or storage container by the enterprise system 110. The indicator devices 140 are arrayed within the storage area, each indicator device 140 corresponding to a different storage subarea or storage container that holds items of one or more specified item types. The indicator devices 140 are located in close physical proximity or attached to their respective storage subareas or storage containers.

Each indicator device 140 responds to the activation signal of the interrogator device 130 if two conditions are met: (1) the interrogator device 130 is close enough to the indicator device and has direct line-of-sight in the case of infrared or visible light communication and that the short-range activation signal that reaches the indicator device is strong enough to be sensed by the indicator device; and (2) the item identifier code of the activation signal corresponds to the subarea or storage container associated with the indicator device 140. If both of these conditions are satisfied, the indicator device 140 sends an indication signal in response to the activation signal.

The indication signal allows the user to determine the location of the item corresponding to the current item entry being processed. The user perceives the indication signal, proceeds to the indicated location (that is, storage container or storage subarea), and selects the item(s) in accordance with the item type and quantity specified by the item entry. Once the selection of the item(s) is complete, a confirmation is provided to the mobile computing device 140, and the mobile computing device 140 directs the interrogator device 130 to stop transmitting the activation signal. The mobile computing device 140 then proceeds to the next item entry. Each item entry is then similarly processed as described above until all items included in the picklist are selected.

Figure 2:
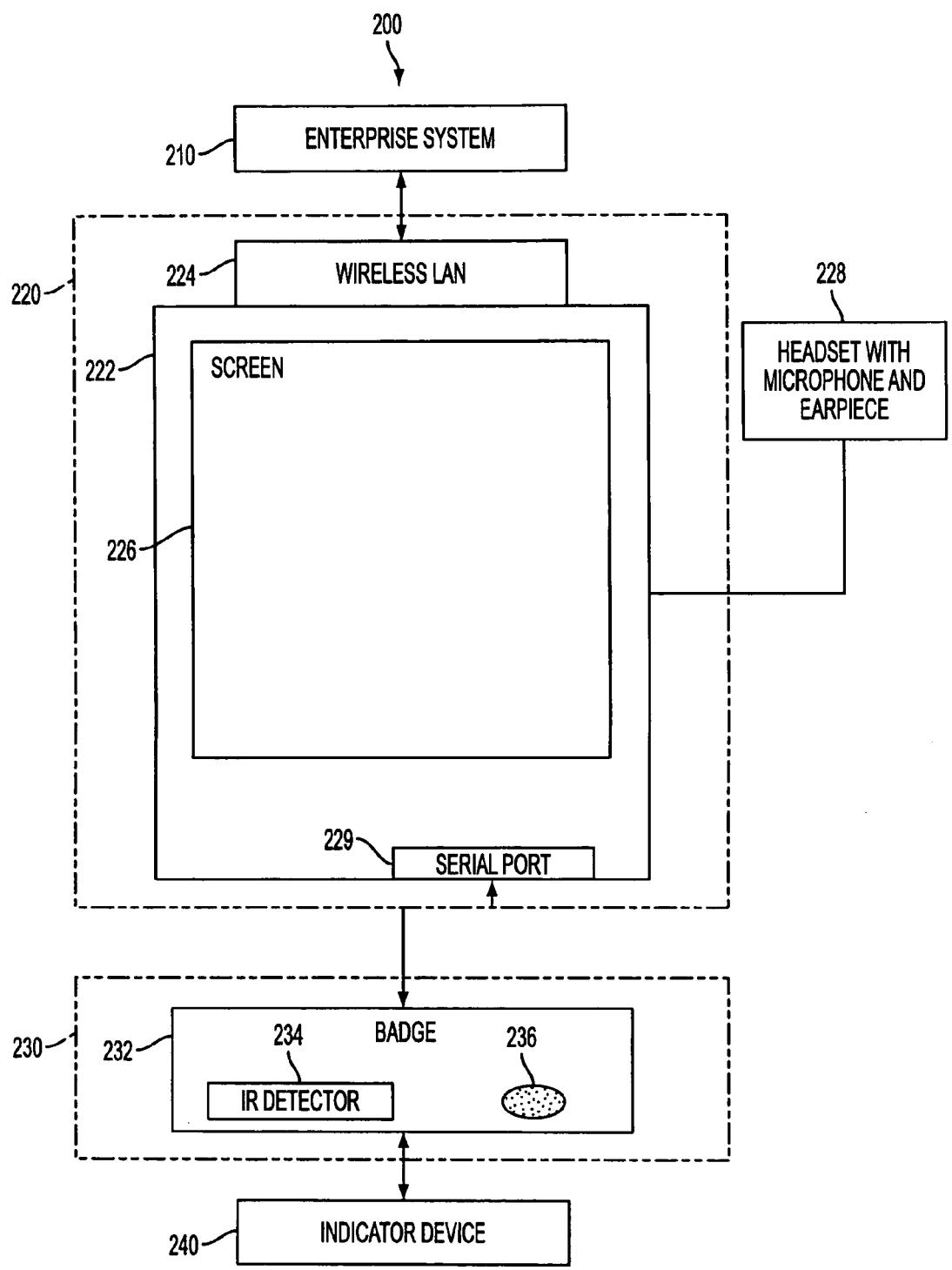
FIG. 2 is a block diagram of the item selection system of FIG. 1 showing an exemplary implementation of a mobile computing device and an interrogator device.

FIG. 2 shows an exemplary implementation 200 of the item selection system 100 of FIG. 1. The functionality of the enterprise system 210, the mobile computing device 220, the interrogator device 230, and the indicator device 240 is analogous to that of, respectively, the enterprise system 110, the mobile computing device 120, the interrogator device 130, and the indicator device 140.

The mobile computing device 220 may be a handheld personal digital assistant (PDA) 222 that includes a wireless LAN port 224, a display screen 226, a headset with microphone and earpiece 228, and a serial port 229. The enterprise system 210 provides the PDA 222 with one or more item entries in a list of items to select in the storage area (that is, a picklist). The PDA 222 receives these entries from the enterprise system 210 via the wireless LAN port 224. The item entries may be displayed or otherwise visually accessed all at once or one entry at a time via the display screen 226 of the PDA 222. Alternatively or additionally, the item entries may be enunciated to the user via voice using the headset with microphone and earpiece 228. The user may access and page through the item entries stored in the PDA 222 via, for example, a keyboard (not shown), via pressing the screen 226 with a stylus (not shown), or via voice commands using the headset with microphone and earpiece 228.

After downloading one or more item entries from the enterprise system 210, the PDA 222 processes the list of item entries one entry at a time in an order that may or may not be predetermined. The item selection process may be initiated, for example, manually by the user via PDA input (for example, keyboard, stylus, or voice), automatically and without user input by the PDA 222, or by the enterprise system 210.

The PDA 222 and/or the enterprise system 210 associates each item entry in the list with an identifier code using the item storage subarea or item storage container information in the item entry. The mapping of item storage subareas or item storage containers to identifier codes is accomplished through a system setup process that takes place prior to the start of the item selection process. For ease of discussion, the system setup process is described after the description of the item selection process.

When processing an item entry, the PDA 222 sends an item identifier code to the interrogator device 230 using the serial port 229. The item identifier code corresponds to the storage subarea or storage container that holds the item types listed in the item entry.

The interrogator device 230 is a badge 232 that may be secured to the clothes of the user and connected to the serial port 229 of the PDA 222 by a conductor (not shown). The badge 232 includes an infrared (IR) detector 234 and an IR transmitter 236.

The badge 232 receives the identifier code from the mobile computing device 220 via the conductor (not shown) and transmits an IR activation signal using the IR transmitter 236. The identifier code is embedded in the IR activation signal. Transmitting codes in IR signals is a proven technology understood by one skilled in the art. This technology has been used, for example, in television remote controls.

The IR activation signal is continuously sent out by the badge 232. Due to the short-range nature of the signal caused by attenuation of the signal over distance, an indicator device 240 will typically only detect the IR activation signal when the badge 232 is moved into close physical proximity (for example, 5–10 feet) to the indicator device 240. In addition, direct line-of-sight from the badge 232 to the indicator device 240 will normally be needed. The indicator device 240 then determines whether the code received corresponds to its own code. If the transmitted code is associated with the code of the given indicator device 240, the indicator device 240 sends out an indicator signal that informs the user of the location of the indicator device 240. If the code is not associated with the code of the given indicator device, the indicator device 240 does not send an indicator signal.

The short-range nature of the activation signal and the reqirement for direct-line-of-sight for the infrared signal allows multiple users with interrogator devices to select items simultaneously within the same storage area without confusion. Each user only activates indicator devices within their immediate physical vicinity (that is, the range of the short-range activation signal) and within their visual range since the IR badge is worn on the front of the user and radiates forward. Therefore, if the users are sufficiently separated from each other while selecting items in the storage area, each user will only respond to their own local indicator signals. The indicator signals directed at other users will not be near enough and in direct-line-of-sight to the user to cause confusion. This localized generation of indicator signals by the item selection systems 100, 200 decreases the cognitive steps required by the users to determine which indicator signals to respond to, and thus which items to pick, when multiple pickers are selecting items in the same storage area. Decreasing the cognitive steps that a user must perform when picking items improves the accuracy of the item selection process by reducing the opportunities for human error.

The indicator device 240 may be battery-powered and fastened onto a storage subarea or storage container using, for example, a clip or a magnet. Alternatively, the indicator device 240 may include a base or a stand and be positioned on top or near a storage subarea or storage container. The indicator device 240 may also fit into a holder or similar type attachment device coupled to the storage subarea or storage container. Because the indicator devices 240 do not need to be connected by any wires, the location of the indicator devices 240 may be changed freely. This mobility offers the flexibility necessary for efficient use of the systems 100, 200 in, for example, a warehouse environment in which the location of storage containers and item storage areas may frequently change. The size of the indicator device is typically driven by the size and power of the required battery.

In this implementation, each indicator device 240 is associated with a different identifier code that is mapped to the storage container on which the indicator device is attached. When an item entry is being processed, the location information of the item entry is used to determine the appropriate storage container identifier code. The mapping of storage containers to identifier codes occurs during a setup or configuration step prior to the beginning of the item selection process.

Figure 3:
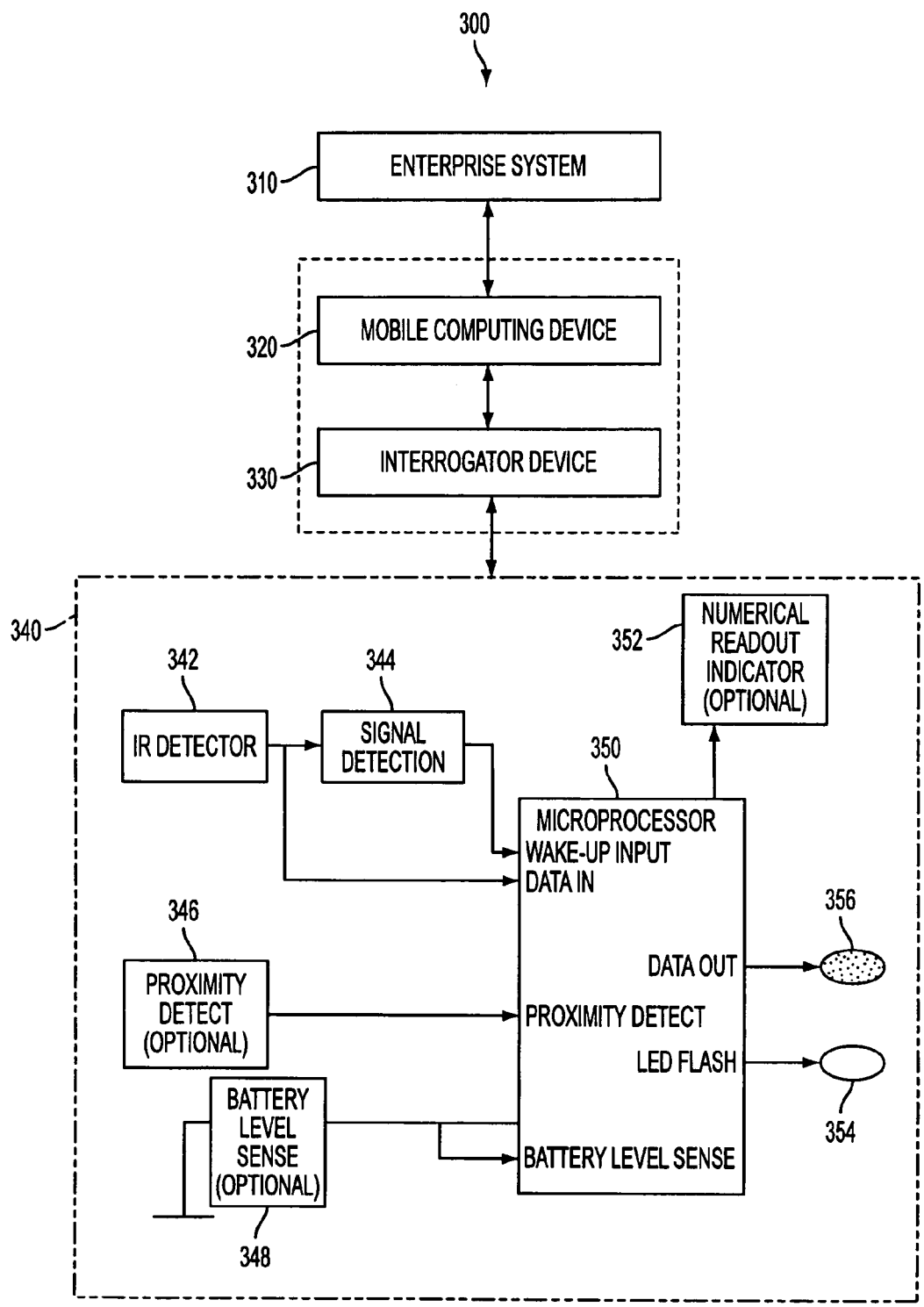
FIG. 3 is a block diagram of the item selection system of FIG. 1 showing an exemplary implementation of an indicator device.

FIG. 3 shows another implementation 300 of the item selection system 100 including an exemplary circuit schematic for an indicator device 340. The functionality of the enterprise system 310, the mobile computing device 320, the interrogator device 330, and the indicator device 340 is analogous to that of, respectively, the enterprise system 110, the mobile computing device 120, the interrogator device 130, and the indicator device 140. The indicator device 340 includes an IR-Detector 342, signal detection circuitry 344, optional proximity detection circuitry 346, optional battery level sense circuitry 348, a microprocessor 350, an optional numerical indicator 352, a light emitting diode (LED) 354, and an optional IR transmitter 356.

Figure 4:
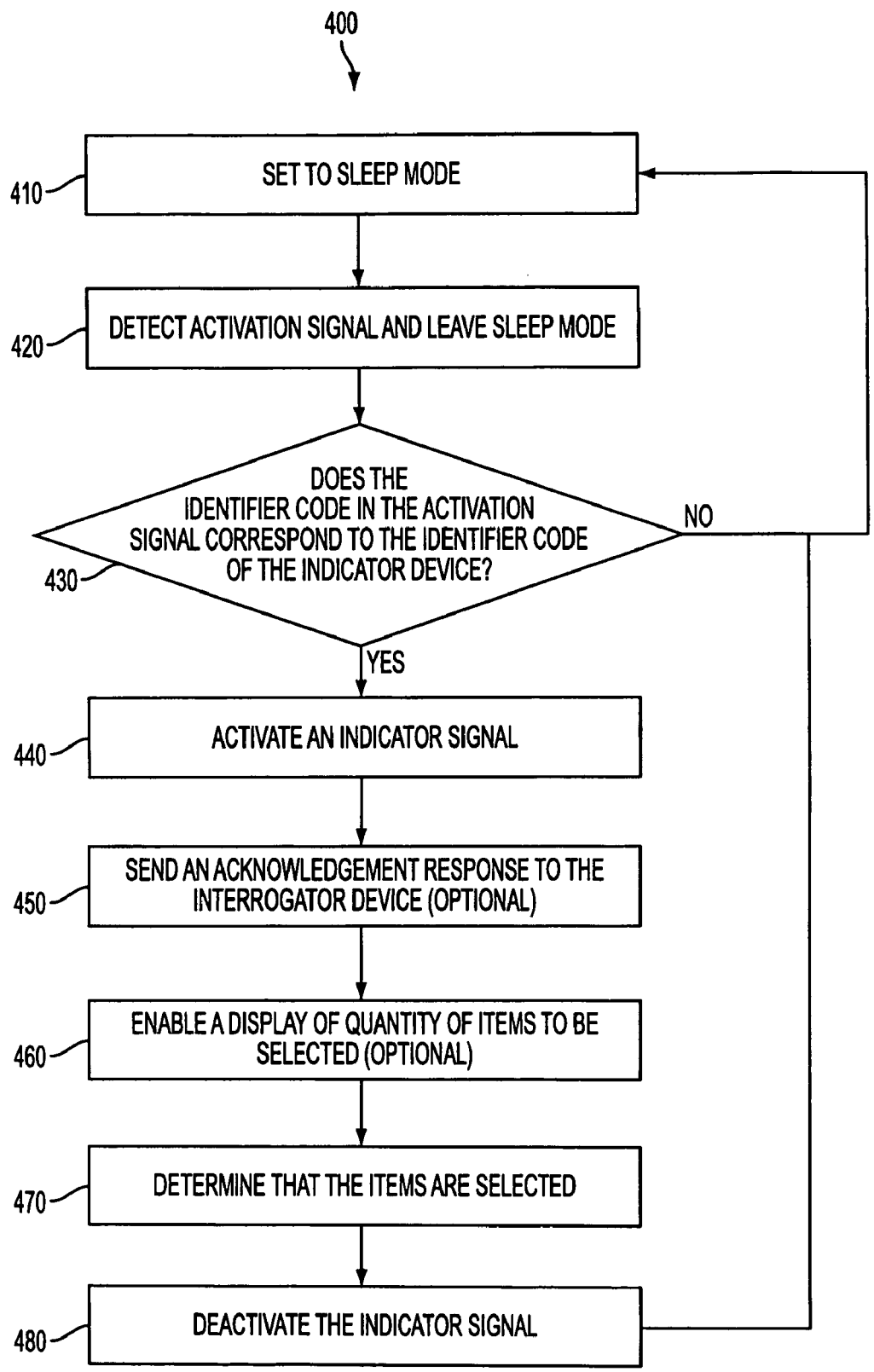
FIG. 4 is an exemplary block diagram of a process depicting the operation of an indicator device.

FIG. 4 shows a process 400 used by the indicator device 340 to inform a user whether or not item(s) should be selected from an item storage container or item storage subarea associated with the indicator device 340. The indicator device 340 is in "sleep" mode prior to being activated by the IR activation signal of the interrogator device 330 (410). While in sleep mode, the microprocessor 350 of the indicator device 340 is placed into a low-power mode to conserve battery power. When an IR activation signal is detected by the IR detector 342, the signal detection circuitry 344 sends a "wake-up" signal to the microprocessor 350 that instructs the microprocessor 350 to leave the low-power mode and power-up completely (420).

The IR detector 342 converts the IR activation signal into an electrical signal that includes the identifier code and sends the signal to the microprocessor 350. The microprocessor 350 analyzes the identifier code (430) and, if the identifier code does not correspond to the code associated with the indicator device 340, the microprocessor 350 deactivates by returning to sleep mode.

If, however, the code does correspond to the code associated with the indicator device 340, the microprocessor 350 sends out a signal to activate the LED 354 (440), thereby generating an indicator signal. The LED 354 generates an indicator signal, for example, by being illuminated or by flashing. The microprocessor 350 may additionally send out an acknowledgement response to the interrogator device 330 using the optional transmitter 356 (450).

The user may perceive the illuminated or flashing LED 354, for example, and proceed to the location of the indicator device 340. The user may then access the associated storage container or subarea to retrieve the item(s) described in the item entry being processed.

The user may determine the quantity of items that should be selected from the storage subarea or storage container by looking at the display screen 326 of the PDA 322 or by receiving the quantity information vocally via the headset 328. The user may then input an item selection complete command into the PDA 322 upon completion of the selection of the quantity of items. This may be accomplished by manually interfacing with the PDA 322 using a stylus (not shown) or keyboard (not shown) or by vocally interfacing with the PDA 322 using the headset 328. The PDA 322 responds to the command by sending a confirmation signal to the badge 332.

The badge 332 converts the confirmation signal into an IR signal using the IR transmitter 336 and transmits the confirmation signal to the indicator device 340. Alternatively, the badge 332 may simply stop transmitting the identifier code in response to the confirmation signal.

In various implementations, the indicator device may enable a display of the quantity of items to be selected (460). In one such implementation, the indicator device 340 may eliminate the need for the user to manually or vocally input the item selection complete command into the PDA 322 by using optional proximity detection circuitry 346 to sense each time an item is selected from the storage subarea or storage container. The proximity detection circuitry 346 senses or detects an arm reaching into the storage subarea or storage container. This circuitry may be magnetic (that is, a magneto resistive sensor), capacitive, or of another comparable technology type. For example, a magneto resistive sensor may detect a small magnet or possibly just a metal watchband worn on the wrist of the user. The detection circuitry 346 senses each time the arm of the user with the attached metal watchband or magnet reaches into the storage subarea or storage container.

Upon the arm reaching into the storage subarea or storage container, the proximity detection circuitry 346 sends an "item selection detected" signal to the microprocessor 350. The microprocessor 350 then sends the "item selection detected" signal to the optional IR transmitter 356 which converts the signal into an IR signal and transmits it to the interrogator device 330.

The badge 332 detects the "item selection detected" signal through its IR detector 334 and converts it into an electrical signal that is sent to the PDA 322. The PDA 322 then decrements the quantity of items corresponding to the item entry being processed by one.

The indicator device 340 determines that the items are selected (470). The IR detector 342 of the indicator device may, for example, detect the confirmation signal from the badge 332, detect the absence of the identifier code signal from the badge 332, or determine that the quantity to be selected has been decremented to zero. The IR detector 342 then informs the microprocessor 350 (470). The microprocessor 350 then deactivates the LED 354 (480) and returns to sleep mode (410).

Upon the quantity decrementing to zero, the PDA 322 sends out a confirmation signal as discussed above and proceeds to the next item entry in the picklist. The user is directed to stop selecting items from the storage container or subarea vocally or visually by the PDA 322 using the headset 328 or the display screen 326, respectively. Alternatively or additionally, the user is directed to stop selecting items and proceed to the next item entry by simply perceiving the deactivation of the LED 354 (that is, it stops being illuminated or stops flashing).

The use of the proximity detection circuitry 346 to keep track of item quantity information may require that the user select items in a specified manner to enable accurate detection by the circuitry 346. For example, the user may have to reach into the storage subarea or storage container a single time for each item selected despite, perhaps, the ability of the user to grab multiple items during a single reach-in.

The indicator device 340 may also include the optional numerical indicator display 352 that displays the quantity of items that should be selected from the associated storage subarea or storage container. The numerical indicator display 352 may be, for example, a simple liquid crystal display (LCD) or a comparable lightweight, low-cost, low power display screen.

The quantity information that is displayed on the numerical indicator display 352 may be received from the mobile computing device 320 via the interrogator device 330. In this implementation, the identifier code of the activation signal may include both an identifier that specifies a single indicator device 340 and an additional code that specifies the quantity of items that needs to be selected by the user. The microprocessor 350 of an indicator device 340 only examines the quantity portion of the code if the microprocessor 350 determines that the identifier is associated with the identifier of its indicator device 340. If the identifier portion of the identifier code does not correspond to the given indicator device 340, the indicator device 340 deactivates by returning to sleep mode.

When the indicator device 340 is activated and receives the quantity information for the item entry that is being processed, the numerical indicator 352 on the indicator device 340 may be directed by the microprocessor 350 to display the quantity information (460), simplifying the conveyance of this information to the user. Alternatively or additionally, the microprocessor 350 may direct the flash pattern of the LED 354 to indicate the quantity information.

The optional proximity detection circuitry 346 may be used in conjunction with the optional numerical indicator display 352 to provide the user with a dynamic indicator of the number of items that should be selected from the storage subarea or storage container. The microprocessor 350 decrements the quantity of items that should be selected each time the proximity detection circuitry 346 detects the user reaching into the subarea or storage container. The flash pattern of the LED 354 may change in accordance with the decremented quantity. Similarly, the numerical display 352 may decrement the displayed quantity in accordance with the decremented quantity.

Upon the quantity being decremented to zero, the microprocessor 350 then sends a single "selection complete" signal, thereby eliminating the need to continuously send out the "item selection detected" signals each time the user reaches into the storage subarea or storage container. Furthermore, upon sending the "selection complete signal," the microprocessor 350 deactivates the LED 354 completely and returns to sleep mode, thereby eliminating the need for a separate confirmation signal.

The indicator device 340 also includes the optional battery level sense circuitry 348. The battery level sense circuitry 348 detects the battery level of the indicator device 340. Specific circuit-level implementation of battery level sense circuitry 348 is understood by one skilled in the art, and is, therefore, not discussed further. The battery level sense circuitry 348 may be external to the microprocessor 350 or, alternatively, incorporated in the microprocessor 350.

The microprocessor 350 communicates the battery level of the indicator device 350 to the user by sending a battery level signal using the IR transmitter 356. The IR detector 334 of the badge 332 detects the battery level signal, converts it into an electrical signal, and conveys it to the PDA 322. The PDA 322 may then provide a visual display on the display screen 326 to indicate the battery level or, additionally or alternatively, may provide an audible or vocal signal to the user using the headset 328. The audible signal may be as simple as a beep to the user indicating that the battery is low and needs to be replaced.

The optional numerical readout indicator 352 may also be used to indicate the battery level of the battery in the indicator device 340. In this case, the microprocessor 350 may direct the readout indicator 352 to display a number or a figure representative of the battery level. The microprocessor 350 may provide the battery level information to the readout indicator 352 additionally or instead of the battery level signal that it provides to the badge 332 using the IR transmitter 356.

Figure 5:
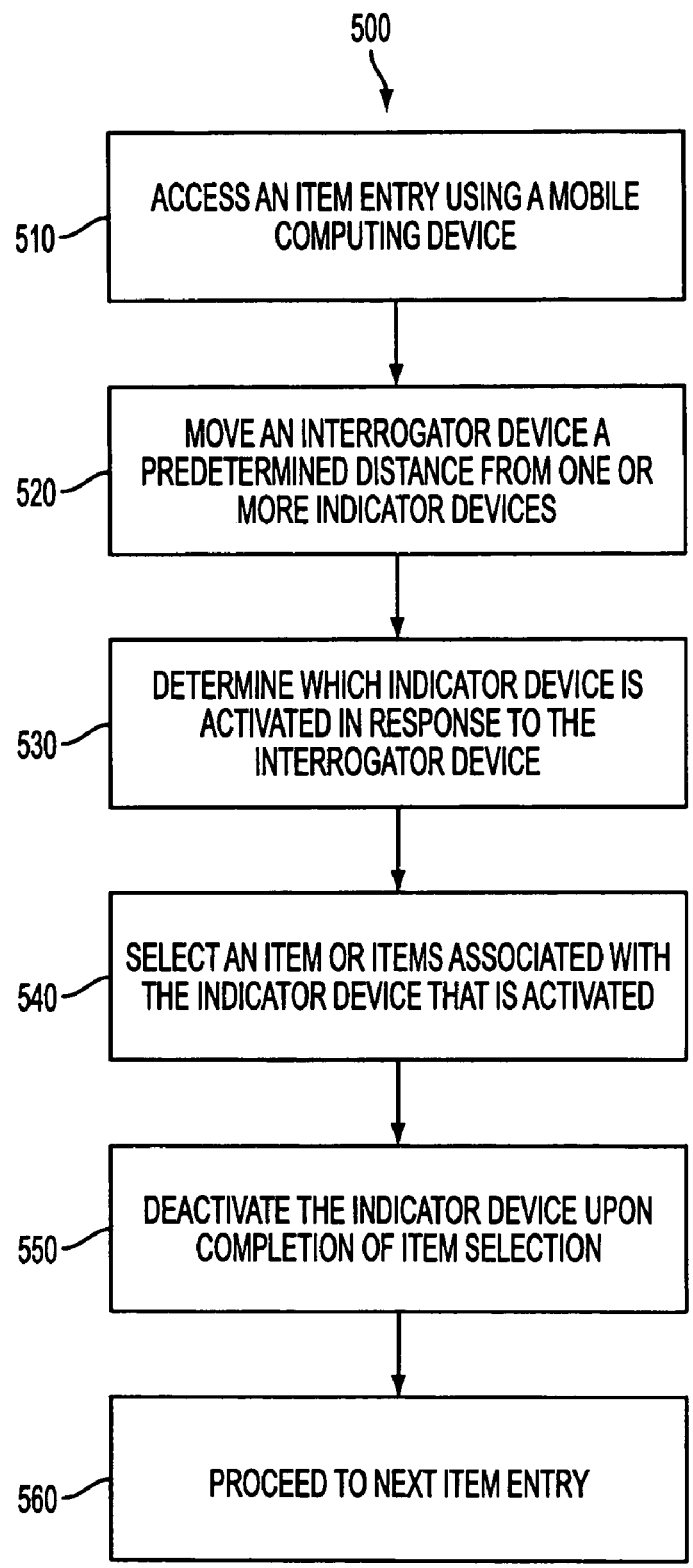
FIG. 5 is an exemplary block diagram of a process for selecting an item using the item selection system of FIG. 1.

FIG. 5 shows a process 500 for selecting an item using a system such as, for example, one of the systems 100, 200, 300. The process 500 includes accessing an item entry using a mobile computing device (510). The user walks into the storage area with the mobile computing device 120 and the interrogator device 130 attached to his or her person. The mobile computing device 120 may automatically access, or be manually instructed by the user to access, an entry in the current picklist to be processed.

The entry may be accessed from the memory of the mobile computing device 120 after having downloaded all entries in the picklist from the enterprise system 110, or the entry may be accessed by downloading it individually and directly from the enterprise system 110. The item entry may provide the mobile computing device 120 with the item type, the item quantity, and the item identifier code of the storage container or storage subarea in which the item(s) described in the entry are located. The item entry may also provide other information such as actual stocking location and handling instructions for the item. The mobile computing device 120 instructs the interrogator device 130 to send out an activation signal associated with the item identifier code of the accessed item entry.

The process 500 includes the user moving an interrogator device 230 to within a predetermined distance or range and within-line-of-sight of one or more indicator devices 140 (520). Typically, the user will follow a predetermined path in accordance with the layout of the storage area. The entries in the picklist may be ordered by the enterprise system 110 or possibly by the mobile computing device 120 in such a way as to allow the user to progress along the predetermined path while selecting items without ever having to backtrack. When the interrogator device 130 is moved a predetermined distance (for example, 5–10 feet in the case of system 200) from one or more indicator devices 140, the short-range activation signal being transmitted by the interrogator device 130 is typically strong enough for the indicator devices 140 to activate and sense the signal. The indicator devices 140 are then able to determine whether the code embedded in the signal is associated with their own respective codes. If none of the indicator devices 140 detect their own code in the activation signal, they all deactivate and return to sleep mode. If one of the indicator devices 140 detects its code in the signal, it activates and sends an indicator signal to the user by, for example, illuminating or flashing an LED.

The process 500 includes the user determining which indicator device 140 is activated in response to the interrogator device 130 based on the indicator signal (530). The user then proceeds to the location of the indicator device 140 that is activated.

The process 500 includes the user selecting an item or items associated with the indicator device 140 that is activated (540). An indication of the quantity of items to select may be accessed from the mobile computing device 120 or from the indicator device 130 as discussed previously with respect to FIGS. 2 and 3.

The process 500 includes deactivating the indicator device upon completion of item selection (550). Once the user completes selecting the items described by the item entry, the mobile computing device 120, the indicator device 130, and/or the user may deactivate the indicator device 130. The indicator device 130 then returns to low-power or sleep mode. The user may then proceed to the next item entry in the picklist and begin the process again (560).

Figure 6:
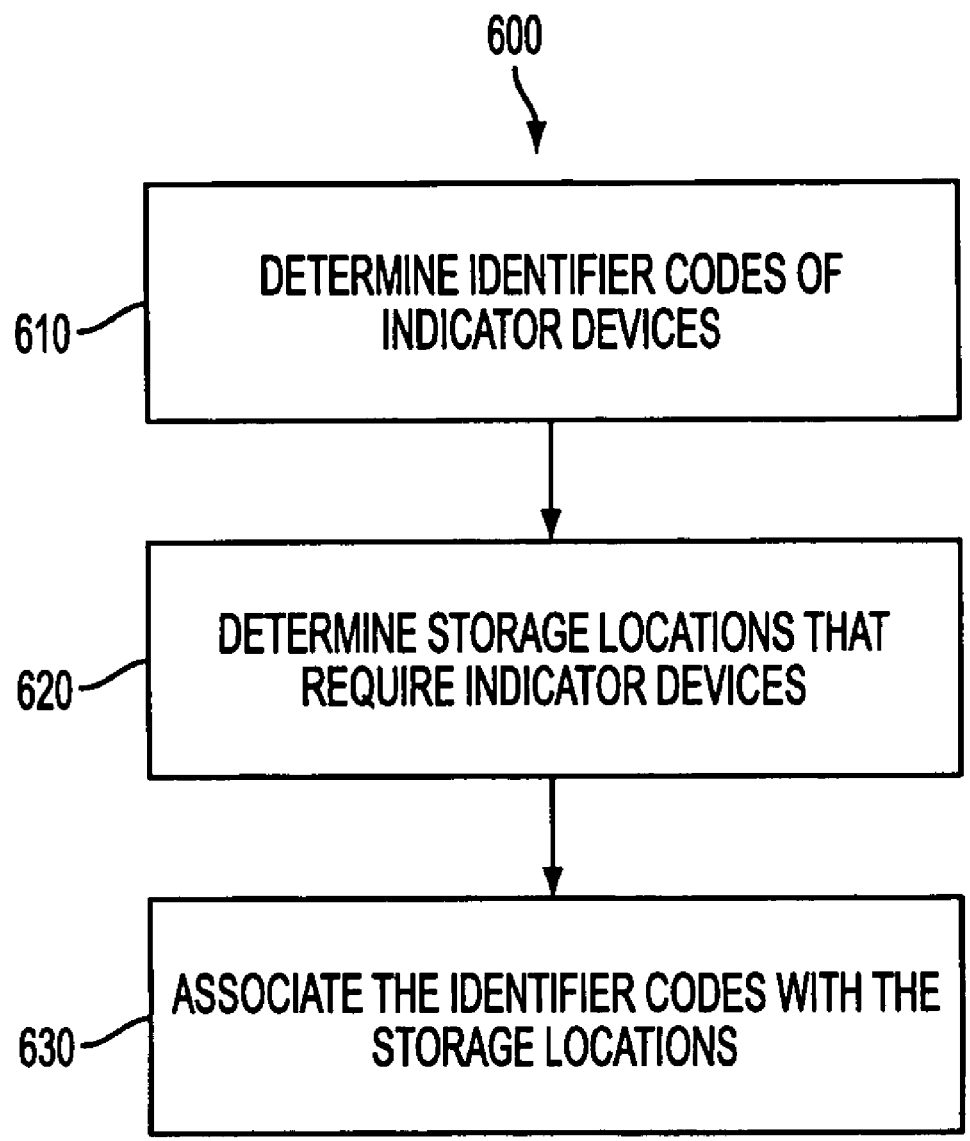
FIG. 6 is an exemplary block diagram of a process to setup the item selection system of FIG. 1

FIG. 6 shows a system setup process 600. The system setup process 600 precedes the item selection process 500 described above. The system setup process 600 begins by determining the identifier codes of the indicator devices 140 (610). This determination may be accomplished either manually or automatically. In a manual setup, an operator determines the identifier codes by visually inspecting the identifier code associated with each indicator device 140. Note that the identifier code of each indicator device 140 may be printed on the indicator device 140 itself or may be included in the packaging materials of each indicator device 140. In an automatic setup, the operator need not determine the identifier code associated with each indicator device because the system 100 will automatically determine the identifier code during the mapping operation discussed below.

The process 600 includes determining storage locations that require indicator devices 140 (620). In both manual and automatic setups, the operator may use, for example, the mobile computing device 120 to access one or more storage location entries that correspond to storage locations that require indicator devices. The enterprise system 110, the mobile computing device 120, or the operator may determine the storage locations that require indicator devices 140.

The process 600 includes associating the identifier codes of the indicator devices 140 with the storage locations (630). The operator approaches, in an order that may or may not be predetermined, one or more of the storage subareas or containers corresponding to the accessed storage location entries. The operator then attaches or adheres indicator devices 140 to the storage subareas or containers.

In a manual setup, the operator may manually associate or map the identifier code with the storage location entry by scanning the storage labels attached to each storage subarea or container using, for example, a barcode reader (not shown) and then manually inputting the identifier codes of the corresponding attached indicator devices 140. The storage location label may include some or all of the storage information stored in the enterprise system 110. The storage location label is typically affixed to the storage subarea or container. The mapping is then preferably sent to and stored in the enterprise system 110, but may also be stored in the mobile computing device 120.

In an automatic setup, the operator does not manually input the identifier codes corresponding to the attached indicator devices 140. Rather, the indicator devices 140 may transmit the identifier codes to the interrogator device 130 in response to the interrogator device 130 sending a "general wakeup" code. The operator instructs the interrogator device 130 to send the "general wakeup" code and proceeds to each storage location corresponding to the accessed storage location entries. If the interrogator device 130 is brought close enough to a given indicator device 140, the identity code from that indicator device 140 may be uniquely detected and associated with that storage location. The operator then reads the storage label using, for example, a barcode reader and then the mobile computing device 120 automatically associates or maps the identifier code detected by the interrogator device 130 to that storage location. The mapping may then be stored in the mobile computing device 120 or sent to the enterprise system 110.

Other implementations are possible. For example, the mobile computing device 120 may be a PDA, a laptop computer, a belt-mounted computer, or another computing device that is preferably designed to be portable and designed to minimally encumber a user's hands and mobility during operation. The mobile computing device 120, however, may also be a large and bulky computing device placed on a mobile cart. Alternatively, the mobile computing device 120 may be stationary but include a portable and mobile communications device that interfaces with the operator.

The mobile computing device 120 may contain a cellular modem to communicate with the enterprise system 110. Alternatively, the mobile computing device 120 may communicate with the enterprise system 110 over a wide area radio network. The mobile computing device 120 may also operate offline, for example, through the use of a docking station.

The mobile computing device 120 may allow the operator to choose the order in which the item entries in the selection list are processed. The mobile computing device 120 may, for example, allow an operator to choose the order by displaying a list of item entries on the display screen 226 of the PDA 220 and allowing the operator to select any entry in the list to process.

The interrogator device 130 may be located at fixed points on the ceiling of the storage area. In such an implementation, the mobile computing device 120 may activate the stationary interrogator devices 130 directly using a wireless communications port or indirectly via the enterprise system 110. One, more than one, or all of the stationary interrogator devices 130 may simultaneously send out a given identifier code when the mobile computing device 120 is processing an item entry. The stationary interrogator devices 130 may be positioned so as to allow the interrogator devices 130 to cover and activate some or all of the indicator devices 140 attached to some or all of the storage subareas and/or containers within the storage area.

The interrogator device 130 and the mobile computing device 120 may be integrated in a single unit. As an example, a palmtop computing device or personal digital assistant may have a built-in IR communication feature.

The interrogator device 130 may generate an activation signal using visible light, short-range radio (for example, by employing a short-range radio connectivity standard such as Bluetooth or IEEE 802.11), or other frequencies in the electromagnetic spectrum. The interrogator device 130 could also generate an activation signal using ultrasonic sound.

The interrogator device 130 may send the activation signal at intervals of time that are regular or random in duration and that may or may not be predetermined. The interrogator device 130 may be able to transmit multiple activation signals, each of a different frequency. This allows certain indicator devices to be sensitive to some activation signals but not to others.

The interrogator device 130 may be a portable device that may be attached to the clothes of an operator. The interrogator device may also be a handheld device that is worn around the wrist or neck.

The numerical readout indicator 352 may additionally display the quantity of items selected and/or the total quantity of items currently in the storage subarea or storage container. The readout indicator 352 may dynamically receive the total item quantity information from the mobile computing device 320 via the interrogator device 330 each time a selection of items occurs. Alternatively or additionally, the readout indicator 352 may receive the total quantity of items in the storage subarea or storage container one time during the system setup process. Subsequent item selections from the storage bin or container may simply decrement this initial quantity. In such an implementation, the system setup process may also take place each time new items are stocked.

The user rather than the PDA 222 may inform the indicator device 240 that the item selection is complete by manually pressing a button or manually inputting the information into the indicator device 240 using an attached manual interface (for example, a numerical indicator with an attached set of buttons or a single button). The microprocessor 250 may sense the user pressing the button and send a confirmation signal to the mobile computing device 220 via the interrogator device 230 prior to deactivating and returning the indicator device 240 to sleep mode. The manual interface may be a number pad that allows a user to manually input exactly how many items were selected. The microprocessor 250 may also provide this information to the mobile computing device 220.

The item selection system 100 may be used as an item stocking system, for example, when automated stocking proves inefficient. In such an implementation, the lists of items to select are replaced by lists of items to stock. Rather than selecting items from the storage containers or storage subareas, the user places items into the storage containers and storage subareas. The quantity in the item entry corresponds to the number of items to place into the corresponding storage area or storage container.

A number of implementations have been described. Nevertheless, various modifications may be made. For example, various operations in the disclosed techniques may be omitted, replaced, supplemented, and/or performed in a different order, and various components in the disclosed systems may be combined in a different manner, omitted, replaced, and/or supplemented by other components. Accordingly, other implementations are within the scope of the following claims.

What is claimed is:

1. An apparatus for requesting the location of items in a storage area, the apparatus comprising:
   a mobile computing device for accessing an entry in a list of items to be selected from item storage subareas within an item storage area, the entry being associated with an item identifier code corresponding to an item storage subarea;

a detecting device for detecting selection by a user of at least one item corresponding to the entry; and a transmitter communicatively coupled to the mobile computing device for:

transmitting a short-range activation signal corresponding to the item identifier code, the short-range activation signal causing an indicator device associated with the item identifier code and in physical proximity to the short-range activation signal to transmit an indicator signal in response to the short-range activation signal that indicates the location of the corresponding item storage subarea; and terminating transmission of the short-range activation signal in response to the detecting device detecting selection by the user of the at least one item corresponding to the entry.

2. The apparatus of claim 1 wherein the activation signal comprises an infrared signal.

3. The apparatus of claim 2 wherein the activation signal includes an embedded identifier code associated with the entry.

4. The apparatus of claim 1 wherein the transmitter comprises a mobile transmitter.

5. The apparatus of claim 1 wherein the mobile computing device comprises a personal digital assistant, a laptop computer, or a belt-mounted computer.

6. The apparatus of claim 1 wherein the mobile computing device receives the entry in the list of items from an enterprise system.

7. The apparatus of claim 6 wherein the enterprise system comprises an inventory management system.

8. The apparatus of claim 6 wherein the mobile computing device receives the entry from the enterprise system by using a docking station.

9. The apparatus of claim 6 wherein the mobile computing device receives the entry from the enterprise system over a wireless network.

10. The apparatus of claim 9 wherein the wireless network comprises a wireless local area network.

11. The apparatus of claim 9 wherein the wireless network comprises a wide area radio network.

12. The apparatus of claim 9 wherein the wireless network comprises a cellular modem network.

13. The apparatus of claim 1 wherein the mobile computing device includes a stationary component and a mobile component.

14. The apparatus of claim 1 wherein the activation signal comprises a short-range radio signal.

15. The apparatus of claim 1 wherein the activation signal comprises a visible light signal.

16. The apparatus of claim 1 wherein the transmitter comprises a portable device that may be attached to the clothing of a person.

17. The apparatus of claim 16 wherein the portable device comprises a badge.

18. The apparatus of claim 1 wherein the transmitter is stationary and located at fixed points in the item storage area.

19. The apparatus of claim 1 wherein the mobile computing device and the transmitter are integrated in a single unit.

20. The apparatus of claim 19 wherein the single unit comprises a palmtop computing device with an integrated infrared communications feature.

21. The apparatus of claim 1 wherein the mobile transmitter is operable to continuously transmit the activation signal.

22. The apparatus of claim 1 wherein the mobile transmitter is operable to transmit the activation signal periodically.

23. The apparatus of claim 22 wherein the duration of the period between transmissions of the activation signal is fixed.

24. The apparatus of claim 22 wherein the duration of the period between transmissions of the activation signal is random.

25. The apparatus of claim 1 wherein the short-range activation signal corresponds to a single type of item.

26. The apparatus of claim 1 wherein each entry in the list of items to be selected includes a single type of item to be selected and a quantity of the items of the single type to be selected.

27. The apparatus of claim 1 wherein the item identifier code is unique to a single type of item.

28. The apparatus of claim 1 wherein the detecting device is for detecting selection by the user of the at least one item from the item storage subarea corresponding to the item identifier code.

29. The apparatus of claim 28 wherein selection by the user of the at least one item comprises manual selection by the user of the at least one item.

30. The apparatus of claim 1 wherein the detection device detects selection based on the user interacting with a user interface of the apparatus to indicate that selection is complete.

31. The apparatus of claim 30 wherein the detection device detects selection based on the user manually interacting with the user interface of the apparatus to indicate that selection is complete.

32. The apparatus of claim 31 wherein the user manually interacting with the user interface comprises the user interacting through use of at least one of a stylus, a keyboard, and a headset.

33. The apparatus of claim 1 wherein the detection device detects selection based on communications originating from proximity detection circuitry.

34. The apparatus of claim 1 wherein the transmitter is physically coupled to the mobile computing device.

35. The apparatus of claim 1 wherein the transmitter is communicatively coupled to the mobile computing device over a wireless connection.

36. The apparatus of claim 35 wherein the transmitter is stationary and located at fixed points in the item storage area.

37. A method for requesting the location of items in a storage area, the method comprising:

accessing an entry in a list of items to be selected from item storage subareas within an item storage area, the entry being associated with an item identifier code corresponding to an item storage subarea;

detecting selection by a user of at least one item corresponding to the entry;

transmitting a short-range activation signal corresponding to the item identifier code, the short-range activation signal causing an indicator device associated with the item identifier code to transmit an indicator signal in response to the short-range activation signal that indicates the location of the corresponding item storage subarea;

terminating transmission of the short-range activation signal in response to detecting selection by a user of the at least one item corresponding to the entry.

38. The method of claim 37 wherein the activation signal comprises an infrared signal.

39. The method of claim 38 wherein the activation signal includes an embedded identifier code associated with the entry.

40. The method of claim 37 wherein accessing the entry includes accessing the entry using a mobile computing device.

41. The method of claim 37 wherein transmitting a short-range activation signal includes transmitting a short-range signal using a transmitter.

42. The method of claim 41 wherein the transmitter comprises a mobile transmitter.

43. The method of claim 42 wherein the mobile transmitter is communicatively coupled to a mobile computing device used to access the entry.

44. The method of claim 37 wherein the indicator signal comprises visible light from a light emitting diode.

45. The method of claim 37 wherein the short-range activation signal corresponds to a single type of item.

46. The method of claim 37 wherein each entry in the list of items to be selected includes a single type of item to be selected and a quantity of the items of the single type to be selected.

47. The method of claim 37 wherein the item identifier code is unique to a single type of item.

48. The method of claim 37 wherein detecting selection by the user comprises detecting selection by the user of the at least one item from the item storage subarea corresponding to the item identifier code.

49. The method of claim 37 wherein the selection by the user of the at least one item comprises manual selection by the user of the at least one item.

50. The method of claim 37 wherein detecting selection by the user comprises detecting selection based on the user interacting with a user interface to indicate that selection is complete.

51. The method of claim 50 wherein detecting selection by the user comprises detecting selection based on the user manually interacting with the user interface of the apparatus to indicate that selection is complete.

52. The method of claim 51 wherein the user manually interacting with the user interface comprises the user interacting through use of at least one of a stylus, a keyboard, and a headset.

53. The method of claim 37 wherein detecting selection by the user comprises detecting selection by the user based on communications originating from proximity detection circuitry.

* * * * *